United States Patent
Tsuchiya et al.

(10) Patent No.: US 11,299,132 B2
(45) Date of Patent: Apr. 12, 2022

(54) DRIVING SUPPORT APPARATUS

(71) Applicant: TOYOTA JIDOSHA KABUSHIKI KAISHA, Toyota (JP)

(72) Inventors: Koichi Tsuchiya, Susono (JP); Kazunori Nogi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 321 days.

(21) Appl. No.: 16/424,748

(22) Filed: May 29, 2019

(65) Prior Publication Data

US 2019/0366991 A1   Dec. 5, 2019

(30) Foreign Application Priority Data

May 30, 2018   (JP) .............................. JP2018-103597

(51) Int. Cl.
  *B60T 8/17*   (2006.01)
  *B60T 7/12*   (2006.01)

(52) U.S. Cl.
  CPC . *B60T 8/17* (2013.01); *B60T 7/12* (2013.01)

(58) Field of Classification Search
  CPC ...................................... B60T 8/17; B60T 7/12
  USPC ......................................................... 701/70
  See application file for complete search history.

(56) References Cited

U.S. PATENT DOCUMENTS

2016/0114799 A1* 4/2016 Kawasaki ............. B60W 10/04
                                                        701/70
2018/0194347 A1* 7/2018 Nakagawa ........ B60W 30/0953

FOREIGN PATENT DOCUMENTS

| CN | 101932484 A | 12/2010 |
| CN | 105539433 A | 5/2016 |
| JP | 54-040432 A | 3/1979 |
| JP | 07069188 A | 3/1995 |
| JP | 2017-024497 A | 2/2017 |

* cited by examiner

*Primary Examiner* — Maceeh Anwari
(74) *Attorney, Agent, or Firm* — Sughrue Mion, PLLC

(57) ABSTRACT

A driving support apparatus is provided with: a determinator configured to determine a collision probability; and a braking controller programmed to perform a braking control, and a preliminary braking control. The braking controller includes: a braking force increaser configured to increase the braking force applied in the preliminary braking control; and a braking force adjuster configured to perform adjustment, if the braking force applied at an end time point of the preliminary braking control is greater than the braking force applied at a start time point of the braking control in such a manner that a braking force applied in transferring from the preliminary braking control to the braking control has a small change amount, or in such a manner that it is greater than the braking force applied at the end time point of the preliminary braking control.

1 Claim, 7 Drawing Sheets

DRIVING SUPPORT APPARATUS

CROSS-REFERENCE TO RELATED APPLICATIONS

This application is based upon and claims the benefit of priority of the prior Japanese Patent Application No. 2018-103597, filed on May 30, 2018, the entire contents of which are incorporated herein by reference.

BACKGROUND

1. Technical Field

Embodiments of the present disclosure relate to a driving support apparatus configured to perform a braking control of a vehicle.

2. Description of the Related Art

There is known an apparatus configured to perform a braking control, i.e., an automatic brake control, of a vehicle to avoid a collision between the vehicle and an obstacle (e.g., another vehicle, a pedestrian, etc.). In this type of apparatus, a preliminary braking control for applying a braking force before the braking control is performed in some cases so as to allow a driver of the vehicle or the like to recognize that the braking control is to be performed (e.g., refer to Japanese Patent Application Laid Open No. S54-040432 (Patent Literature 1)).

For the preliminary braking control, there is proposed a technology/technique of increasing the braking force applied in the preliminary braking control with increasing vehicle speed (e.g., refer to Japanese Patent Application Laid Open No. H07-069188 (Patent Literature 2)). Moreover, there is also proposed a technology/technique of applying a braking force obtained by adding a deceleration corresponding to a brake operation if the brake operation is performed by the driver during the preliminary braking control (e.g., refer to Japanese Patent Application Laid Open No. 2017-024497 (Patent Literature 3)).

As described in the Patent Literature 3, if the deceleration corresponding to the brake operation is added, the braking force applied in the preliminary braking control is possibly greater than a braking force applied in the subsequent braking control. In this case, a deceleration failure may occur in switching from the preliminary braking control to the braking control. In other words, increasing the braking force applied in the preliminary braking control may significantly reduce the braking force in the subsequent switching to the braking control, thereby giving a discomfort to the driver of the vehicle, which is technically problematic.

SUMMARY

In view of the aforementioned problems, it is therefore an object of embodiments of the present disclosure to provide a driving support apparatus that can prevent the deceleration failure, which could occur in switching from the preliminary braking control to the braking control.

The above object of embodiments of the present disclosure can be achieved by a driving support apparatus provided with: a determinator configured to determine a collision probability between a host vehicle and an obstacle; and a braking controller programmed to perform (i) a braking control for applying a braking force for avoiding a collision between the host vehicle and the obstacle to the host vehicle, and (ii) a preliminary braking control for applying to the host vehicle before the braking control a braking force for allowing at least one of a driver of the host vehicle and a driver of another vehicle that is around the host vehicle to recognize that the braking control is to be performed, on the basis of the collision probability, wherein the braking controller including; a braking force increaser configured to increase the braking force applied in the preliminary braking control in accordance with a brake operation if the brake operation is performed by the driver of the host vehicle during execution of the preliminary braking control; and a braking force adjuster configured to perform adjustment, if the braking force applied at an end time point of the preliminary braking control is greater than the braking force applied at a start time point of the braking control as a result of an increase in the braking force applied in the preliminary braking control, which is performed by the braking force increaser, (i) in such a manner that a braking force applied in transferring from the preliminary braking control to the braking control is brought close to the braking force applied at the start time point of the braking control while having a change amount per unit time that is less than a predetermined value, or (ii) in such a manner that the braking force applied at the start time point of the braking control is greater than the braking force applied at the end time point of the preliminary braking control.

DETAILED DESCRIPTION OF THE EMBODIMENTS

DETAILED DESCRIPTION OF THE EMBODIMENTS

A driving support apparatus according to embodiments of the present disclosure will be explained with reference to the drawings.

First Embodiment

Firstly, a driving support apparatus according to a first embodiment of the present disclosure will be explained with reference to FIG. 1 to FIG. 5.

<Configuration of Apparatus>

An explanation will be given to an entire configuration of a vehicle on which the driving support apparatus according to the first embodiment is mounted, with reference to FIG.

Figure 1:
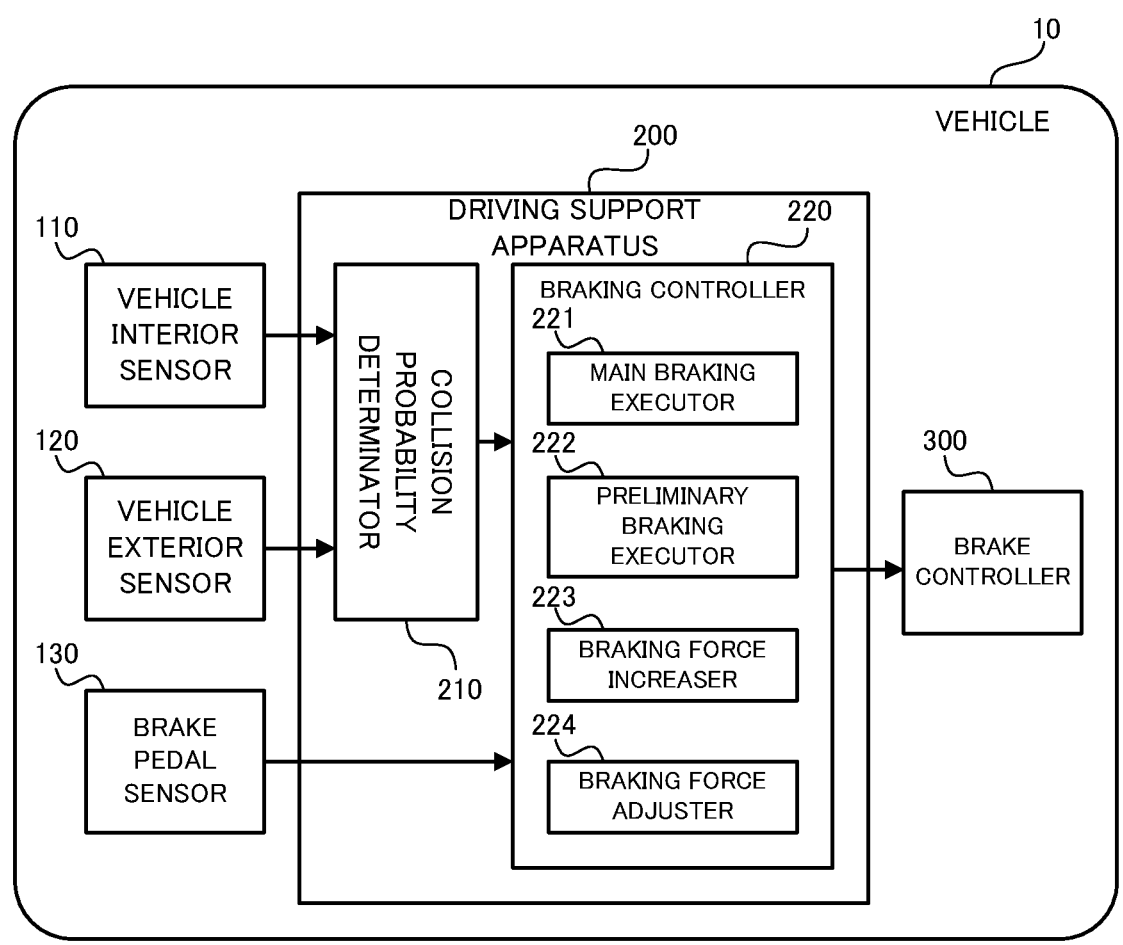
FIG. 1 is a block diagram illustrating a configuration of a vehicle according to a first embodiment.

1. FIG. 1 is a block diagram illustrating the configuration of the vehicle according to the first embodiment.

As illustrated in FIG. 1, a vehicle 10 according to the first embodiment is provided with a vehicle interior sensor 110, a vehicle exterior sensor 120, a brake pedal sensor 130, a driving support apparatus 200, and a brake controller 300.

The vehicle interior sensor 110 may include, for example, a vehicle speed sensor, an acceleration sensor, a yaw rate sensor and the like, and is configured to detect various parameters of the vehicle 10. The vehicle exterior sensor 120 may include, for example, a camera, a radar, a LIDAR and the like, and is configured to detect information about a surrounding environment of the vehicle 10 (e.g., information about an obstacle around the vehicle 10, etc.). The brake pedal sensor 130 is configured to detect an operation of a brake pedal performed by a driver. Detection results of the vehicle interior sensor 110, the vehicle exterior sensor 120, and the brake pedal sensor 130 may be outputted to the driving support apparatus 200.

The driving support apparatus 200 is a controller unit (e.g., an electric control unit (ECU)) configured or programmed to control each part of the vehicle 10. Particularly in the first embodiment, the driving support apparatus 200 is configured or programmed to perform a control for avoiding a collision between the vehicle 10 and the obstacle (specifically, an automatic brake control). The driving support apparatus 200 is provided with a collision probability determinator 210 and a braking controller 220, as processing blocks or physical processing circuits for realizing the aforementioned function.

The collision probability determinator 210 is configured to determine a collision probability between the vehicle 10 and the obstacle that is around the vehicle 10 (e.g., another vehicle, a pedestrian or the like) on the basis of detection results of the vehicle interior sensor 110 and the vehicle exterior sensor 120. A detailed explanation of a specific method of determining the collision probability will be omitted here, because the existing technologies/techniques can be appropriately adopted. A determination result of the collision probability determinator 210 may be outputted to the braking controller 220. The collision probability determinator 210 is a specific example of the "determinator" in Supplementary Notes described later.

The braking controller 220 is configured to perform a control for avoiding a collision of the vehicle 10 on the basis of the determination result of the collision probability determinator 210. The braking controller 220 is provided with a main braking executor 221, a preliminary braking executor 222, a braking force increaser 223, and a braking force adjuster 224, as processing blocks or physical processing circuits for realizing the aforementioned function.

The main braking executor 221 is configured to perform a control for applying a braking force that decelerates the vehicle 10 so as to avoid the collision between the vehicle 10 and the obstacle (hereinafter referred to as "main braking" as occasion demands). On the other hand, the preliminary braking executor 222 is configured to perform a control for applying a braking force to the vehicle 10 so as to allow the driver of the vehicle 10 or a driver of another vehicle that is around the vehicle 10 to recognize that the main braking is to be performed (hereinafter referred to as "preliminary braking" as occasion demands). The main braking and the preliminary braking are respectively an example of the "braking control" and the "preliminary braking control" in Supplementary Notes described later.

Figure 2:
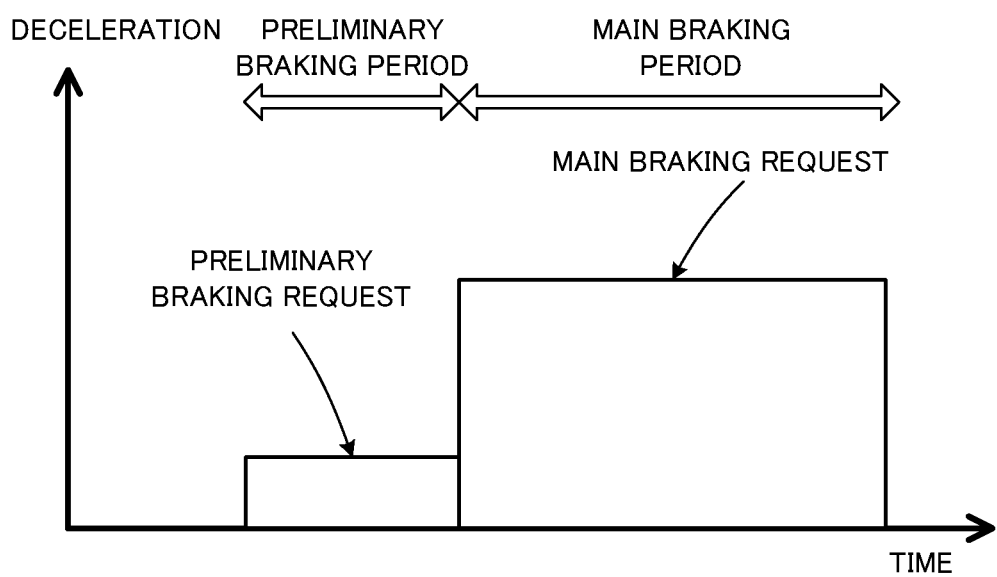
FIG. 2 is a graph illustrating a deceleration required in preliminary braking and main braking performed by a driving support apparatus according to the first embodiment.

Now, the main braking and the preliminary braking described above will be specifically explained with reference to FIG. 2. FIG. 2 is a graph illustrating a deceleration required in the preliminary braking and the main braking performed by the driving support apparatus according to the first embodiment.

As illustrated in FIG. 2, in a preliminary braking period in which the preliminary braking is performed, the braking force is applied in accordance with a preliminary braking request, i.e., a deceleration required in the preliminary braking. On the other hand, in a main braking period in which the main braking is performed, the braking force is applied in accordance with a main braking request, i.e., a deceleration required in the main braking. As is clear from the drawing, the preliminary braking request required in the preliminary braking is less than the main braking request required in the main braking. This is because in the preliminary braking it is only sufficient to inform the driver beforehand that the main braking control is to be performed later, and thus, a large deceleration that allows the collision to be avoided, i.e., that suddenly decelerates the vehicle 10, is not required. In contrast, the main braking requires a large deceleration that allows the collision to be avoided.

Back in FIG. 1, the braking force increaser 223 is configured to perform a control for increasing the braking force applied in the preliminary braking, in accordance with the detection result of the brake pedal sensor 130, i.e., a brake operation performed by the driver of the vehicle 10. Specifically, the braking force increaser 223 may add a braking force corresponding to the brake operation (in other words, a step amount of a brake pedal) to the braking force applied in the preliminary braking, if the brake operation is detected in the period in which the preliminary braking is performed. Thus, if the brake operation is performed in the preliminary braking period, a larger braking force is applied in comparison with the braking force when the brake operation is not performed. According to such a control, it is possible to avoid a situation in which the vehicle 10 is not decelerated, i.e., a situation in which only a relatively small braking force corresponding to the original preliminary braking request is applied, regardless of the operation of the brake pedal. The braking force increaser 223 is a specific example of the "braking force increaser" in Supplementary Notes described later.

The braking force adjuster 224 is configured to perform a control for adjusting a braking force applied in transferring from the preliminary braking to the main braking, if the braking force in the preliminary braking is greater than the braking force in the main braking as a result of an increase in the braking force of the preliminary braking, which is performed by the braking force increaser 223. A specific operation of the braking force adjuster 224, i.e., a specific method of adjusting the braking force, will be explained in detail later. The braking force adjuster 224 is a specific example of the "braking force adjuster" in Supplementary Notes described later.

The brake controller 300 may include, for example, a brake actuator, and is configured to generate the braking force in the vehicle 10 in accordance with an output from the braking controller 220, i.e., the deceleration required in the main braking and the preliminary braking.

<Problems in Braking Control>

Figure 3:
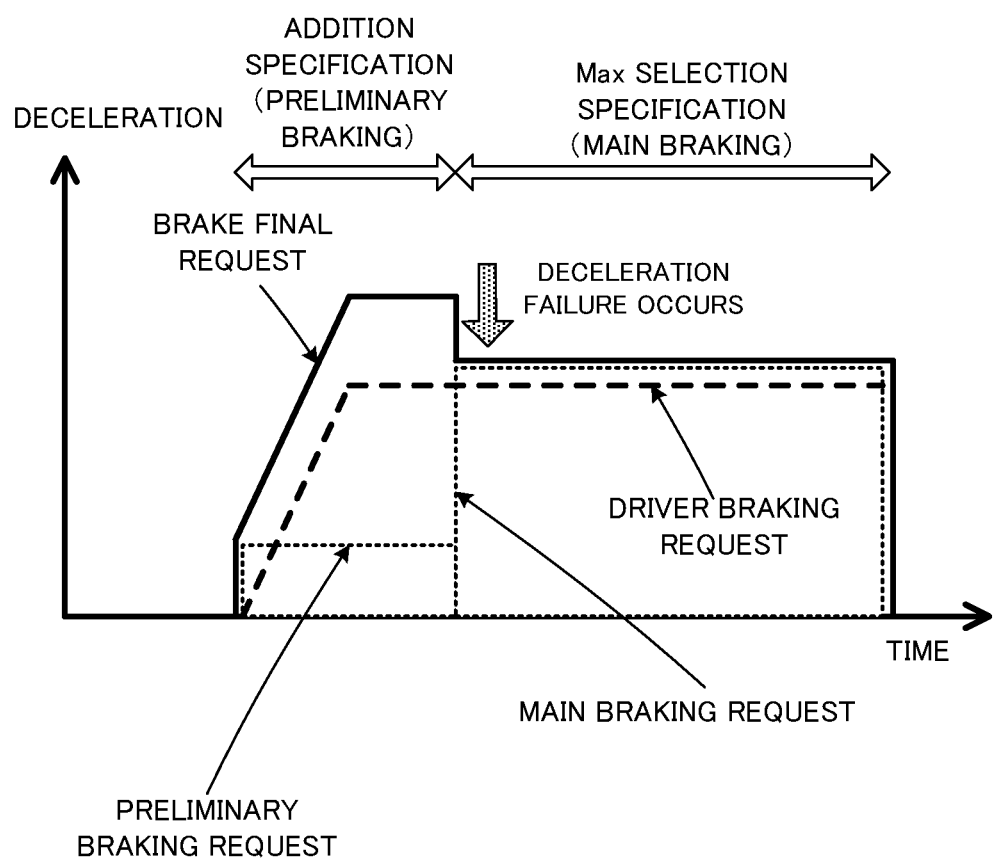
FIG. 3 is a graph illustrating a deceleration failure that could occur in switching from the preliminary braking to the main braking.

Next, problems that could occur in switching from the preliminary braking to the main braking will be explained with reference to FIG. 3. FIG. 3 is a graph illustrating a deceleration failure that could occur in switching from the preliminary braking to the main braking.

As illustrated in FIG. 3, in the preliminary braking, a value obtained by adding a deceleration request corresponding to the brake operation performed by the driver of the vehicle 10 (i.e., a "driver braking request" in FIG. 3) to the original preliminary braking request, is a final deceleration request actually required in the vehicle 10 (i.e., a "brake final request" in FIG. 3.). In other words, the preliminary braking has an "addition specification" in which the deceleration request is added in accordance with the brake operation (or put it differently, the braking force applied is obtained by the addition).

On the other hand, in the main braking, the final deceleration request actually required in the vehicle 10 does not change in accordance with the brake operation performed by the driver of the vehicle 10, and a certain braking force that allows the vehicle 10 to be sufficiently decelerated is applied. The main braking request may be set in advance to realize a predetermined deceleration, and does not have to change in accordance with a vehicle speed or the like at that time. In the example illustrated in FIG. 3, the main braking request is used as the brake final request without a change; however, the driver braking request may be used as the brake final request if the driver braking request is greater than the main braking request. As described above, the main braking has a "Max selection specification" in which one of the main braking request and the driver braking request that is greater than the other is selectively used.

As described above, the preliminary braking has the "addition specification", and the main braking has the "Max selection specification, and they are different specifications. Therefore, the braking force in the preliminary braking, which should be theoretically less than the braking force in the main braking, may be greater than the braking force in the main braking in some cases. More specifically, if the driver braking request corresponding to the brake operation performed by the driver is greater than a difference between the preliminary braking request and the main braking request, the brake final request in the preliminary braking is possibly greater than the brake final request in the main braking.

If the brake final request in the preliminary braking is greater than the brake final request in the main braking and if no measures are taken, the deceleration (or put it differently, the braking force) is suddenly reduced, as illustrated in FIG. 3, in switching from the preliminary braking to the main braking. Then, the deceleration is reduced in a situation in which the collision of the vehicle 10 is to be avoided, which may cause the driver of the vehicle 10 to feel the deceleration failure. The driving support apparatus 200 according to the first embodiment is configured to perform operations described later so as to prevent the occurrence of the failure deceleration as described above.

<Explanation of Operation>

Figure 4:
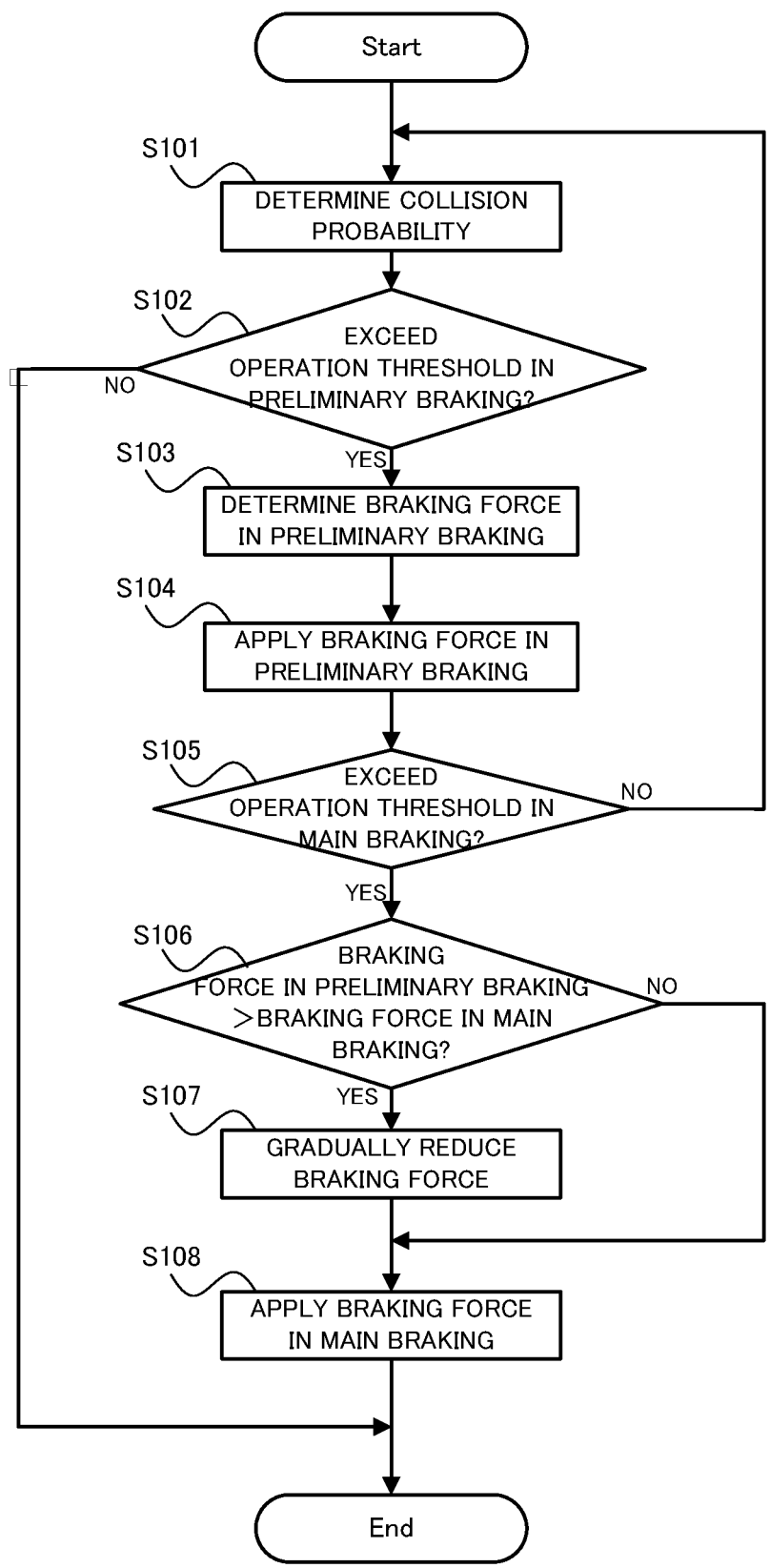
FIG. 4 is a flowchart illustrating a flow of operations of the driving support apparatus according to the first embodiment.

A flow of the operations of the driving support apparatus 200 according to the first embodiment will be explained with reference to FIG. 4. FIG. 4 is a flowchart illustrating the flow of the operations of the driving support apparatus according to the first embodiment.

As illustrated in FIG. 4, in operation of the driving support apparatus 200 according to the first embodiment, the collision probability determinator 210 firstly determines the collision probability between the vehicle 10 and the obstacle (step S101). The determination result of the collision probability determinator 210 may be outputted to the braking controller 220.

The preliminary braking executor 222 then determines whether or not the collision probability determined by the collision probability determinator 210 exceeds an operation threshold value in the preliminary braking (step S102). The operation threshold value in the preliminary braking may be set as a threshold value for determining that the collision probability is high enough to determine that it will be possibly in a situation in which the main braking, i.e., the control for avoiding the collision of the vehicle 10, is to be performed. If the collision probability does not exceed the operation threshold value in the preliminary braking (the step S102: NO), it is determined that it is not necessary to perform the preliminary braking at a present time point, and the subsequent process is omitted. In this case, the step S101 may be restarted after a lapse of a predetermined period.

On the other hand, if the collision probability exceeds the operation threshold value in the preliminary braking (the step S102: YES), the preliminary braking executor 222 determines the braking force applied in the preliminary braking (step S103). At this time, if the brake operation is performed by the driver of the vehicle 10, the braking force increaser 223 adds the driver braking request to the preliminary braking request. In other words, the braking force increaser 223 may increase the braking force applied in the preliminary braking in accordance with the brake operation. The preliminary braking executor 222 then outputs a control content to the brake controller 300 so that the determined braking force is applied to the vehicle 10 (step S104).

The main braking executor 221 then determines whether or not the collision probability determined by the collision probability determinator 210 exceeds an operation threshold value in the main braking (step S105). The operation threshold value in the main braking may be a threshold value for determining whether or not it is in a situation in which the deceleration for avoiding the collision is to be performed, and may be set to be higher than the operation threshold in the preliminary braking. If the collision probability does not exceed the operation threshold value in the main braking (the step S105: NO), it is determined that it is not necessary to perform the main braking at a present time point, and the process is repeated from the step S101. Thus, the preliminary braking keeps being performed in a situation in which the collision probability exceeds the operation threshold in the preliminary braking but does not exceed the operation threshold in the main braking. If the brake operation that has been performed is stopped or is newly started during the preliminary braking, then, the braking force in the preliminary braking changes at each time.

On the other hand, if the collision probability exceeds the operation threshold value in the main braking (the step S105: YES), the braking force adjuster 224 determines whether or not the braking force in the preliminary braking is greater than the braking force in the main braking (step S106). In other words, the braking force adjuster 224 may determine whether or not the braking force applied in the present preliminary braking exceeds the braking force to be applied in the subsequent main braking due to an increase in the braking force in the preliminary braking caused by the brake operation performed by the driver. The braking force in the preliminary braking and the braking force in the main braking used in the comparison in the step S106 are respectively an example of the "braking force applied at the end point of the preliminary braking control" and the "braking force applied at the start point of the braking control" in Supplementary Notes described later.

If it is determined that the braking force in the preliminary braking is greater than the braking force in the main braking (the step S106: YES), the main braking executor 221 outputs the main braking request, which indicates the braking force in the main braking. At this time, the braking force adjuster 224 performs a control for gradually reducing the currently applied braking force so as to bring the braking force applied in the present preliminary braking close to the braking force in the main braking, while having a change amount per unit time that is less than a predetermined value (step S107). The "predetermined value" here may be small enough for the driver of the vehicle 10 not to feel the deceleration failure, and an optimum value may be set in advance by simulations or the like.

As a result of the gradual reduction in the braking force, in the end, the present braking force matches the braking force in the main braking. At that time point, the control for reducing the braking force is stopped, and subsequently, the braking force in the main braking is applied (step S108). If it is determined that the braking force in the preliminary braking is not greater than the braking force in the main braking (the step S106: NO), the control for gradually reducing the braking force described above is omitted, and the braking force in the main braking is applied from the beginning (the step S108).

<Technical Effect>

Figure 5:
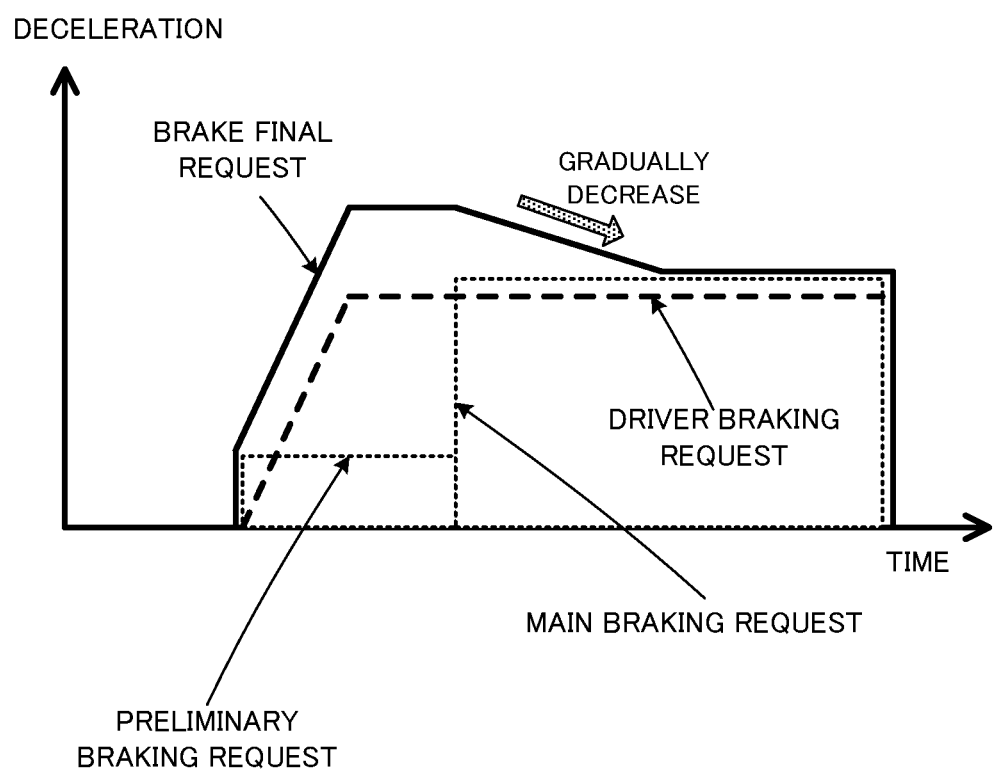
FIG. 5 is a graph illustrating a braking force adjustment operation performed by the driving support apparatus according to the first embodiment.

Next, a technical effect obtained by the driving support apparatus 200 according to the first embodiment will be specifically explained with reference to FIG. 5. FIG. 5 is a graph illustrating a braking force adjustment operation performed by the driving support apparatus according to the first embodiment.

As illustrated in FIG. 5, according to the driving support apparatus 200 in the first embodiment, if the braking force in the preliminary braking is greater than the braking force in the main braking, the braking force is controlled to be gradually reduced in switching from the preliminary braking to the main braking. In other words, the braking force in the preliminary braking is not instantaneously switched to the braking force in the main braking, but the braking force is controlled to be slowly reduced, which takes a certain degree of time.

According to such a control, it is possible to avoid a sudden reduction in the braking force applied to the vehicle 10 in switching from the preliminary braking to the main braking. It is therefore possible to prevent the driver of the vehicle 10 from feeling the deceleration failure (refer to FIG. 3).

Second Embodiment

Next, a driving support apparatus 200 according to a second embodiment will be explained with reference to FIG. 6 and FIG. 7. The second embodiment is partially different in the operation from the first embodiment explained above, but is substantially the same in the other part. Thus, hereinafter, a different part from that of the first embodiment will be explained in detail, and an explanation of the other same part will be omitted.

<Explanation of Operation>

A flow of operation of the driving support apparatus 200 according to the second embodiment will be explained with reference to FIG. 6. FIG. 6 is a flowchart illustrating the flow of the operations of the driving support apparatus according to the second embodiment. In FIG. 6, the same steps as those in the first embodiment illustrated in FIG. 4 carry the same reference numerals.

Figure 6:
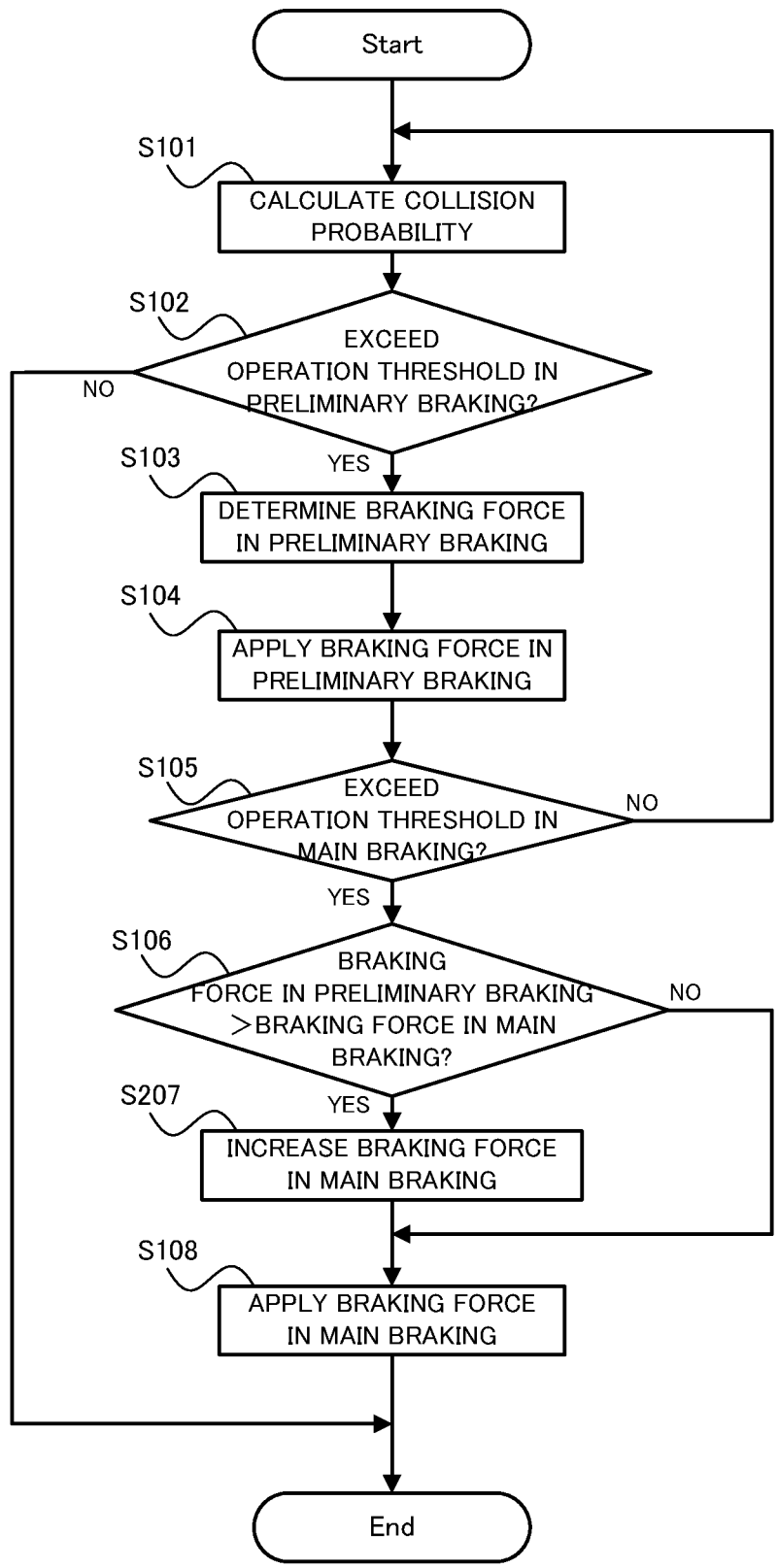
FIG. 6 is a flowchart illustrating a flow of operations of a driving support apparatus according to a second embodiment.

As illustrated in FIG. 6, in operation of the driving support apparatus 200 according to the second embodiment, the step S101 to the step S106 are performed in the same manner as in the first embodiment. Particularly in the second embodiment, if it is determined that the braking force in the preliminary braking is greater than the braking force in the main braking (the step S106: YES), the braking force adjuster 224 performs a control for increasing the braking force in the main braking, i.e., the main braking request (step S207). Specifically, the braking force adjuster 224 may increase the main braking request in such a manner that the braking force in the main braking is greater than or equal to the preceding braking force in the preliminary braking.

Then, the preliminary braking is switched to the main braking, and the increased braking force in the main braking is applied to the vehicle 10 (the step S108). If it is determined that the braking force in the preliminary braking is not greater than the braking force in the main braking (the step S106: NO), the control for increasing the braking force described above is omitted, and the braking force corresponding to the main braking request set in advance is applied (the step S108).

<Technical Effect>

Next, a technical effect obtained by the driving support apparatus 200 according to the second embodiment will be specifically explained with reference to FIG. 7. FIG. 7 is a graph illustrating a braking force adjustment operation performed by the driving support apparatus according to the second embodiment.

Figure 7:
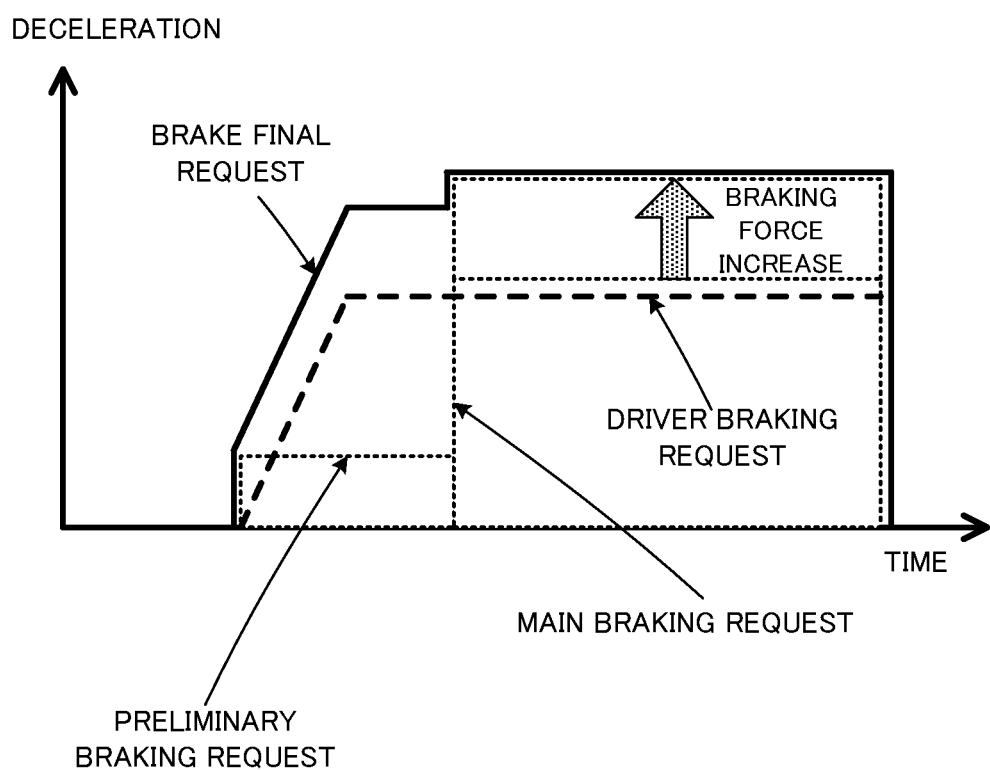
FIG. 7 is a graph illustrating a braking force adjustment operation performed by the driving support apparatus according to the second embodiment.

As illustrated in FIG. 7, according to the driving support apparatus 200 in the second embodiment, if the braking force in the preliminary braking is greater than the braking force in the main braking, the braking force in the main braking is increased to be greater than or equal to the braking force in the preliminary braking. Thus, even if the braking force in the preliminary braking is increased by the brake operation, the braking force actually applied in the main braking is greater than or equal to the preceding braking force applied in the preliminary braking.

According to such a control, it is possible to avoid a sudden reduction in the braking force applied to the vehicle 10 in switching from the preliminary braking to the main braking. It is therefore possible to prevent the driver of the vehicle 10 from feeling the deceleration failure (refer to FIG. 3).

Even if a control for reducing the braking in the preliminary braking is performed instead of the control for increasing the braking force in the main braking, in the end, the braking force at a start time point of the main braking is greater than or equal to the braking force at an end time point of the preliminary braking, and the same effect seems to be obtained. However, the control for intentionally reducing the braking force in the preliminary braking may reduce an addition amount of the braking force corresponding to the brake operation performed by the driver. Then, there arises a situation in which the driver braking request is not added to the preliminary braking request, i.e., the braking force added is insufficient, regardless of the brake operation in the preliminary braking period. As a result, a discomfort due to no response corresponding to the brake operation may be given to the driver. In other words, even if the deceleration failure in switching from the preliminary braking to the main braking can be prevented, there is a possibility to give the discomfort at the time point of the preliminary braking.

In contrast, according to the driving support apparatus 200 in the second embodiment, it is possible to prevent the deceleration failure in switching from the preliminary braking to the main braking without giving the discomfort at the time point of the preliminary braking.

<Supplementary Notes>

Various aspects of embodiments of the present disclosure derived from the embodiments explained above will be explained hereinafter.

(Supplementary Note 1)

A driving support apparatus described in Supplementary Note 1 is provided with: a determinator configured to determine a collision probability between a host vehicle and an obstacle; and a braking controller programmed to perform (i) a braking control for applying a braking force for avoiding a collision between the host vehicle and the obstacle to the host vehicle, and (ii) a preliminary braking control for applying to the host vehicle before the braking control a braking force for allowing at least one of a driver of the host vehicle and a driver of another vehicle that is around the host vehicle to recognize that the braking control is to be performed, on the basis of the collision probability, wherein the braking controller including: a braking force increaser configured to increase the braking force applied in the preliminary braking control in accordance with a brake operation if the brake operation is performed by the driver of the host vehicle during execution of the preliminary braking control; and a braking force adjuster configured to perform adjustment, if the braking force applied at an end time point of the preliminary braking control is greater than the braking force applied at a start time point of the braking control as a result of an increase in the braking force applied in the preliminary braking control, which is performed by the braking force increaser, (i) in such a manner that a braking force applied in transferring from the preliminary braking control to the braking control is brought close to the braking force applied at the start time point of the braking control while having a change amount per unit time that is less than a predetermined value, or (ii) in such a manner that the braking force applied at the start time point of the braking control is greater than the braking force applied at the end time point of the preliminary braking control.

According to the driving support apparatus described in Supplementary Note 1, even if the braking force applied in the preliminary braking control is greater than the braking force applied in the braking force due to the brake operation performed by the driver, it is possible to prevent the deceleration failure that could occur in switching from the preliminary braking control to the braking control. Specifically, it is possible to prevent the braking force from being suddenly reduced in a short time, by adjusting the change amount per unit time of the braking force applied in transferring from the preliminary braking control to the braking control, to be less than the predetermined value. On the other hand, it is also possible to prevent the braking force from being reduced in transferring from the preliminary braking control to the braking control, by adjusting the braking force applied at the start time point of the braking control to be greater than or equal to the braking force applied at the end time point of the preliminary braking control. Thus, even in a situation in which the braking force in the preliminary braking control is significantly increased, the driver may not feel the deceleration failure.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving support apparatus comprising:
a determinator configured to determine a collision probability between a host vehicle and an obstacle; and
a braking controller programmed to perform (i) a braking control for applying a braking force for avoiding a collision between the host vehicle and the obstacle to the host vehicle, and (ii) a preliminary braking control for applying to the host vehicle before the braking control a braking force for allowing at least one of a driver of the host vehicle and a driver of another vehicle that is around the host vehicle to recognize that the braking control is to be performed, on the basis of the collision probability, wherein
said braking controller including:
a braking force increaser configured to increase the braking force applied in the preliminary braking control in accordance with a brake operation if the brake operation is performed by the driver of the host vehicle during execution of the preliminary braking control; and
if the braking force applied at an end time point of the preliminary braking control is greater than the braking force applied at a start time point of the braking control as a result of the increase in the braking force applied during the preliminary braking control, a braking force adjuster is configured to perform adjustment (i) in such a manner that a braking force adjustment applied in transferring from the preliminary braking control to the braking control is brought close to the braking force applied at the start time point of the braking control while having a change amount per unit time that is less than a predetermined value, or (ii) in such a manner that the braking force applied at the start time point of the braking control is adjusted to be greater than the braking force applied at the end time point of the preliminary braking control.

* * * * *